(12) United States Patent
Ott et al.

(10) Patent No.: US 12,018,724 B2
(45) Date of Patent: Jun. 25, 2024

(54) BEARING-RACEWAY SYSTEMS AND METHODS

(71) Applicant: Bell Textron Inc., Fort Worth, TX (US)

(72) Inventors: Charles Jared Ott, Keller, TX (US); Eric Stephen Olson, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/678,708

(22) Filed: Feb. 23, 2022

(65) Prior Publication Data

US 2023/0265883 A1 Aug. 24, 2023

(51) Int. Cl.
| | |
|---|---|
| *F16C 35/06* | (2006.01) |
| *F16C 33/12* | (2006.01) |
| *F16C 33/58* | (2006.01) |
| *F16C 35/063* | (2006.01) |
| *F16C 35/07* | (2006.01) |
| *F16C 35/073* | (2006.01) |
| *F16C 43/04* | (2006.01) |

(52) U.S. Cl.
CPC ............ *F16C 35/073* (2013.01); *F16C 33/12* (2013.01); *F16C 33/586* (2013.01); *F16C 35/063* (2013.01); *F16C 43/04* (2013.01); *F16C 2226/60* (2013.01); *F16C 2326/43* (2013.01)

(58) Field of Classification Search
CPC .......... F16C 19/26; F16C 33/12; F16C 35/06; F16C 35/063; F16C 35/0635; F16C 35/07; F16C 35/073; F16C 2226/16; F16C 2226/60; F16C 2326/43; F16C 33/585; F16C 33/586; F16C 33/588; F16C 43/04; F16D 1/0852; F16D 1/0858; F16D 1/09; F16D 1/116; F16D 2001/0903

See application file for complete search history.

(56) References Cited

U.S. PATENT DOCUMENTS

| | | | | |
|---|---|---|---|---|
| 3,276,828 | A | * | 10/1966 | Mansfield .............. F16C 35/063 384/585 |
| 4,240,677 | A | | 12/1980 | Payne et al. |
| 6,893,160 | B2 | | 5/2005 | Casey |
| RE39,027 | E | * | 3/2006 | Johnson ................ F16C 35/063 384/537 |
| 11,041,525 | B1 | | 6/2021 | Mueller et al. |
| 2018/0087670 | A1 | * | 3/2018 | Poster ..................... B64C 27/12 |
| 2019/0390604 | A1 | * | 12/2019 | Garabello ............. F16C 33/586 |
| 2023/0119200 | A1 | * | 4/2023 | Baracca .................. F16C 19/38 29/898.066 |

FOREIGN PATENT DOCUMENTS

GB 2510071 A * 7/2014 ............... F16D 1/05

* cited by examiner

*Primary Examiner* — Alan B Waits
(74) *Attorney, Agent, or Firm* — Bradley Arant Boult Cummings LLP

(57) ABSTRACT

A bearing raceway for a shaft includes a tubular sleeve comprising a raceway section and a clamp section, the raceway section having a hardened outer surface and a first, axially linear, inner surface, and the clamp section having first threads and a second, axially non-linear, inner surface, where the first threads are configured to mate with second threads on a nut to clamp the tubular sleeve to the shaft.

12 Claims, 8 Drawing Sheets

BEARING-RACEWAY SYSTEMS AND METHODS

TECHNICAL FIELD

This disclosure relates in general to bearing raceways, and more particularly, but not by way of limitation, to bearing raceways for use on a mast of a rotor aircraft.

BACKGROUND

This section provides background information to facilitate a better understanding of the various aspects of the disclosure. It should be understood that the statements in this section of this document are to be read in this light, and not as admissions of prior art.

Traditional rotor aircraft masts are made of steel that can be surface hardened. The surface hardened steel can be used as an integral bearing race. However, these hardenable steels are prone to corrosion. For future applications, corrosion-resistant steel has been selected, but corrosion-resistant steel cannot be suitably surface hardened to function as an integral bearing race.

SUMMARY

An exemplary bearing raceway for a shaft includes a tubular sleeve comprising a raceway section and a clamp section, the raceway section having a hardened outer surface and a first, axially linear, inner surface, and the clamp section having first threads and a second, axially non-linear, inner surface, where the first threads are configured to mate with second threads on a nut to clamp the tubular sleeve to the shaft.

An exemplary mast bearing raceway including a rotor aircraft mast comprising a central axis and a raised portion having a first mast surface generally parallel to the central axis, a bearing raceway secured to the mast, the bearing raceway comprising a tubular sleeve having a raceway section and a clamp section, the raceway section having a hardened outer surface and a first, axially linear, inner surface positioned on the first mast surface, the clamp section having first threads and a second, axially non-linear, inner surface, and a nut having second threads threaded with the first threads imparting a clamping force to the mast.

An exemplary method for securing a bearing raceway on a shaft including sliding a bearing raceway comprising a tubular sleeve having a raceway section and a clamp section onto a shaft, the raceway section having a hardened outer surface and a first, axially linear, inner surface, the clamp section having first threads and a second, axially non-linear, inner surface, positioning the raceway section on a raised portion of the shaft and mating a first element on the clamping section with a second element on the shaft, the second element spaced axially from the raised portion, and threading, after positioning, second threads of a nut with the first threads thereby applying a clamping force between the clamping section and the shaft.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
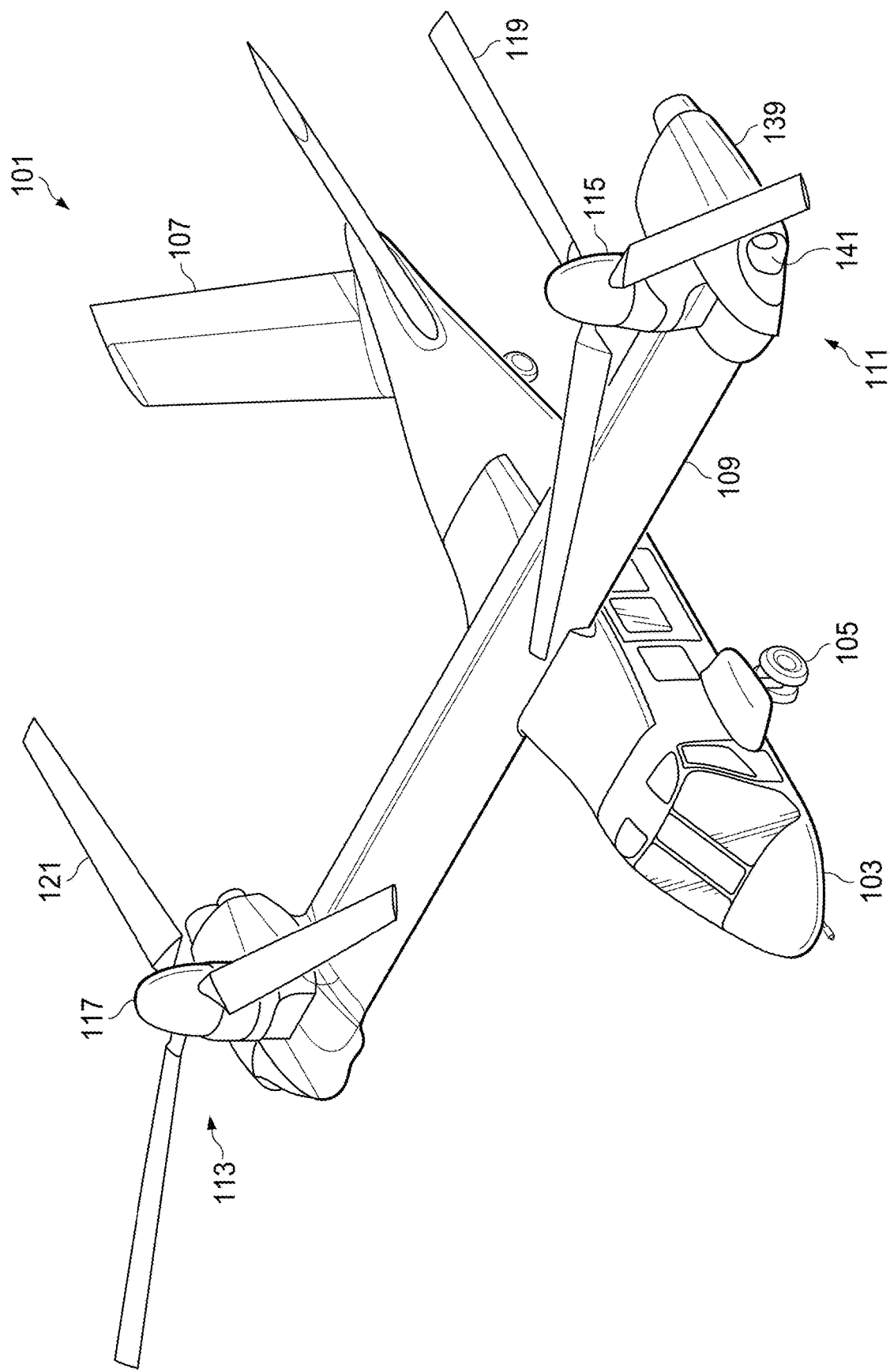
FIG. 1 is a perspective view of an exemplary rotor aircraft in which self-securing bearing raceways may be implemented.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

FIG. 1 illustrates an exemplary tiltrotor aircraft 101, according to aspects of the disclosure. Tiltrotor aircraft 101 includes a fuselage 103, landing gear 105, a tail member 107, a wing 109, a drive system 111, and a drive system 113. Each drive system 111, 113 includes a fixed engine 139 and a proprotor 115, 117, respectively. Each proprotor 115, 117 has a plurality of rotor blades 119, 121, respectively, associated therewith. The position of proprotors 115, 117, as well as the pitch of rotor blades 119, 121, can be selectively controlled in order to selectively control direction, thrust, and lift of tiltrotor aircraft 101.

Drive system 113 is substantially symmetric to drive system 111; therefore, for sake of efficiency, certain features will be disclosed only with regard to drive system 111. However, one of ordinary skill in the art would fully appreciate an understanding of drive system 113 based upon the disclosure herein of drive system 111. Further, drive systems 111, 113 are illustrated in the context of tiltrotor aircraft 101; however, drive systems 111, 113 can be implemented on other tiltrotor aircraft. For example, an alternative embodiment may include a quad tiltrotor that has an additional wing member aft of wing 109; the additional wing member can have additional drive systems similar to drive systems 111, 113. In another embodiment, drive systems 111, 113 can be used with an unmanned version of tiltrotor aircraft 101. Further, drive systems 111, 113 can be integrated into a variety of tiltrotor aircraft configurations. Additionally, other drive systems are contemplated. For example, one example is a gearbox arrangement to provide torque to a rotor system of a helicopter.

Referring to tiltrotor aircraft in general, each drive system 111, 113 includes a mast driven by a power source (e.g., engine 139). The power source, mast, and yoke are components for transmitting torque. The power source may include a variety of components including an engine, a transmission, and differentials. In operation, each mast receives torque from the power source to rotate the yoke. Rotation of the yoke causes the rotor blades to rotate to generate thrust. Each mast includes one or more mast bearings that stabilize and secure the masts relative to the aircraft. Bearings are typically positioned between a rotating component (e.g., the mast) and a stationary component (e.g., a support structure within the nacelle). Roller-type bearings include an outer race that is secured to the stationary component and an inner race that is secured to the mast, which rotates relative to the stationary component. A plurality of rollers or balls are positioned between the inner and outer races to allow the inner race to rotate relative to the outer race. Some bearings further include a separator or cage that spaces the rollers or balls evenly within the bearing. Some conventional mast bearing designs use an outer surface of the mast as the inner race. These conventional masts are typically made from steels that can be surface treated such that the outer surface of the mast can be used as the inner race of the mast bearing. In these designs, the rollers or balls ride upon the outer surface of the mast and the outer race.

While using the outer surface of the mast as the inner bearing race can be desirable as it simplifies the design of the mast, situations can arise where the mast suffers from corrosive wear due to the use of hardened steel. To avoid the issue of corrosive wear, a material that is less prone to corrosive wear (e.g., PH 13-8Mo or Titanium) may be used instead of hardened steel. Using these alternative materials does address the issue of corrosive wear; however, these alternative materials are incapable of being surface hardened to the same extent as the steel used in conventional masts, and thus are insufficient for use as the inner race of the mast bearing. The instant disclosure is directed to a hardened bearing raceway that can be secured to the unhardened mast without adding stress concentrating features, such as threads or retaining ring grooves, to the mast to arrest axial movement of the bearing raceway.

Figure 2:
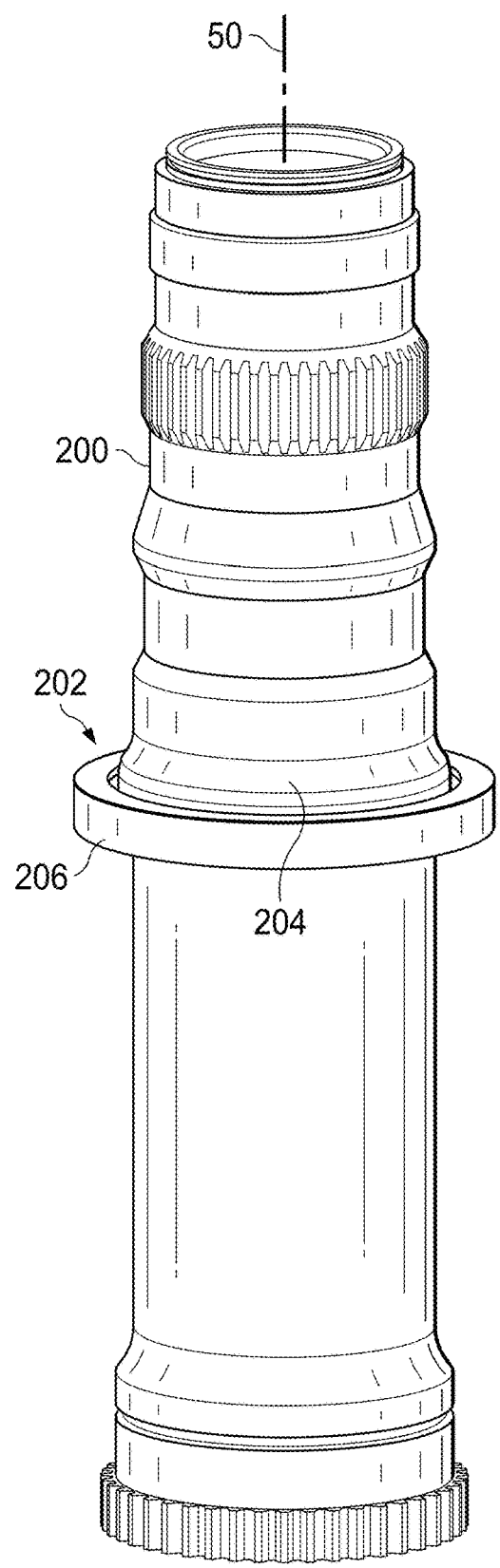
FIG. 2 illustrates an example of a prior art rotor aircraft with an integral bearing raceway.
Figure 3:
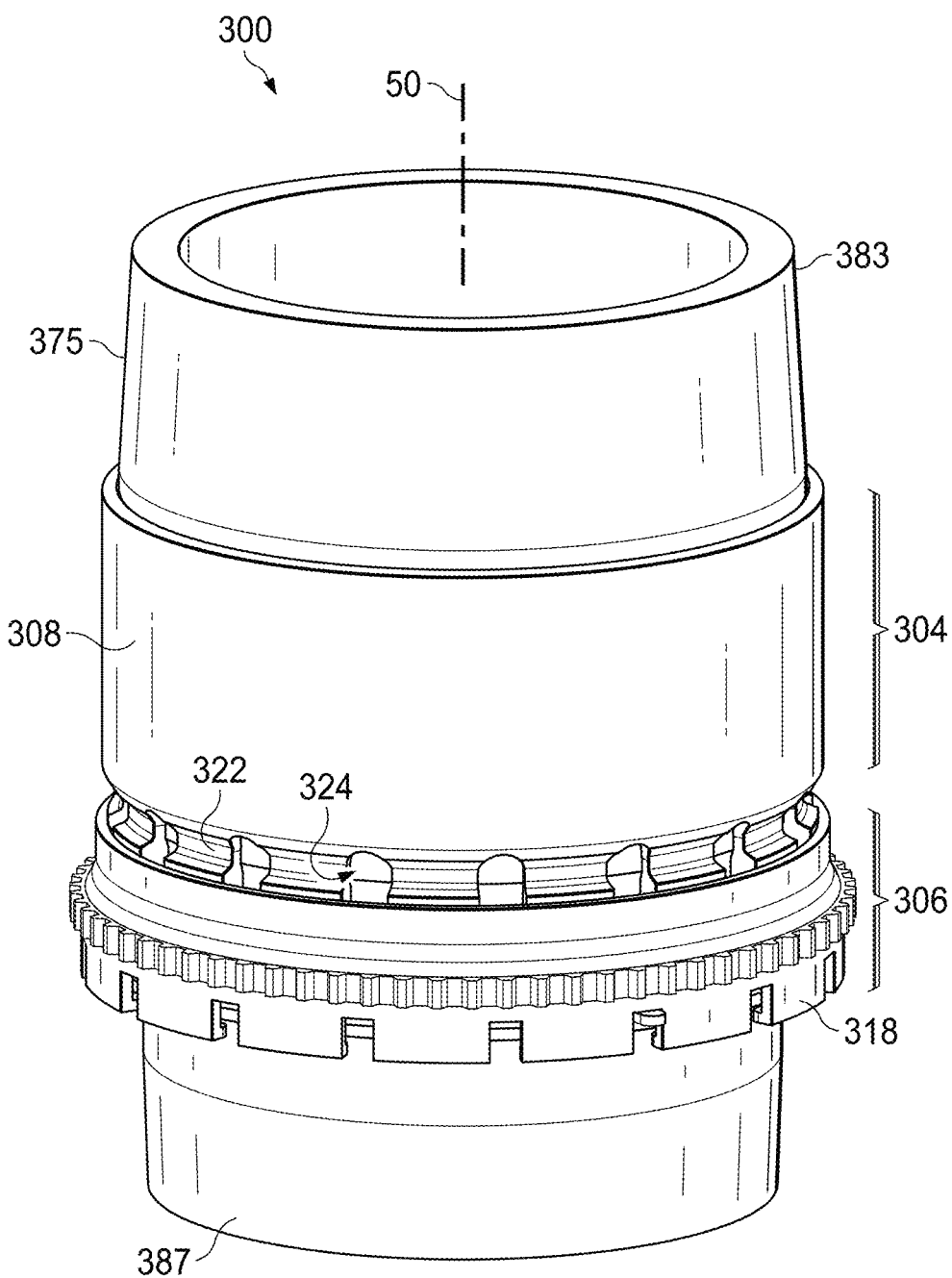
FIG. 3 illustrates an exemplary self-securing bearing raceway clamped on a shaft.

FIG. 2 illustrates a prior art rotor aircraft mast 200 (e.g., shaft) comprising an integrated bearing raceway 202. Integrated bearing raceway 202 is formed by a raised portion 204 of the shaft, extending outward from a central axis 50. Raised portion 204 is formed as a thick wall section of the mast. The outer surface of raised portion 204 is hardened for example by a surface treatment. A bearing 206 is shown mounted directly on raised portion 204 one the outer surface of the raised portion.

FIGS. 3 to 11 illustrate aspects of exemplary self-securing bearing raceways, generally denoted by reference number 300. Bearing raceway 300 includes a tubular sleeve 302 having a raceway section 304 and a clamp section 306. Tubular sleeve 302 is constructed of metal that can be hardened. In particular, the outer surface 308 of raceway section 304 is hardened. The inner surface 310 of raceway section 304 is generally axially linear to mate against the outer surface of a shaft, e.g., a rotor aircraft mast. The inner surface 312 of clamp section 306 is an axially non-linear surface having one or more features to engage the mast in a manner to resist axial movement of the tubular sleeve. Clamp section 306 includes first threads 314 that are cooperative with second threads 316 carried by a nut 318. Clamp section 306 includes an engagement feature 320, or profile 320, that is cooperative with a second engagement feature 389 located on the mast to axially position tubular sleeve 302 with raceway section 304 positioned circumferentially on a raised portion 377 of a mast 375. First engagement feature 320 may be, without limitation a cooperative detent such as a semi-circular groove, recess, or dimple, or elevated feature such as a semi-circular ridge, button, or a raised feature with a face.

Bearing raceway 300 is configured to be positioned on a shaft 375, for example a rotor aircraft mast, and positively retained so that it does not work its way off or fret excessively. Mast 375 has a circumferential raised portion 377 extending radially outward from central axis 50. Raised portion 377 has a mast surface 379 generally parallel to central axis 50. In the described examples, mast surface 379 is not hardened. Raised portion 377 has, in some embodiments, a first angled face 381 oriented toward, or facing, the first end 383 of mast 375 and a second angled face 385 oriented toward a second end 387 of mast 375. Mast 375 includes an engagement feature 389, or engagement profile, located axially from the raised portion that is cooperative with a first engagement feature 320, or engagement profile, on clamp section 306. Engagement feature 389 does not include threads or sharp cut grooves, such as retaining ring grooves, which add stress concentrating features to the mast. Engagement feature 389 may be, without limitation a cooperative detent such as a semi-circular groove, recess, or dimple, or elevated feature such as a semi-circular ridge, button, or a raised feature with a face. In some embodiments, a raised feature 389 may have a greater height, or diameter, than raised portion 377. In some examples, the raised feature 389 may be raised relative to the outer surface of the mast at the location of the raised feature.

Turning now to FIGS. 3 to 9 exemplary aspects of an exemplary bearing raceway 300 having external first threads 314 are described. In an exemplary embodiment, clamp section 306 has a plurality of tabs 322 separated by slots 324. Tabs 322 may carry external threads 314. First engagement feature 320 is located on the tabs. FIGS. 4 to 7 illustrate non-limiting examples of cooperative engagement features 320, 389. In this example, the engagement features or profiles are referred to as detents and are illustrated in the form of generally semi-circular grooves, recesses, or ridges. The raised, or outward extending, feature may have a face. Grooves or recesses formed in the mast are semi-circular so as to not introduce a stress concentrating feature.

Figure 4:
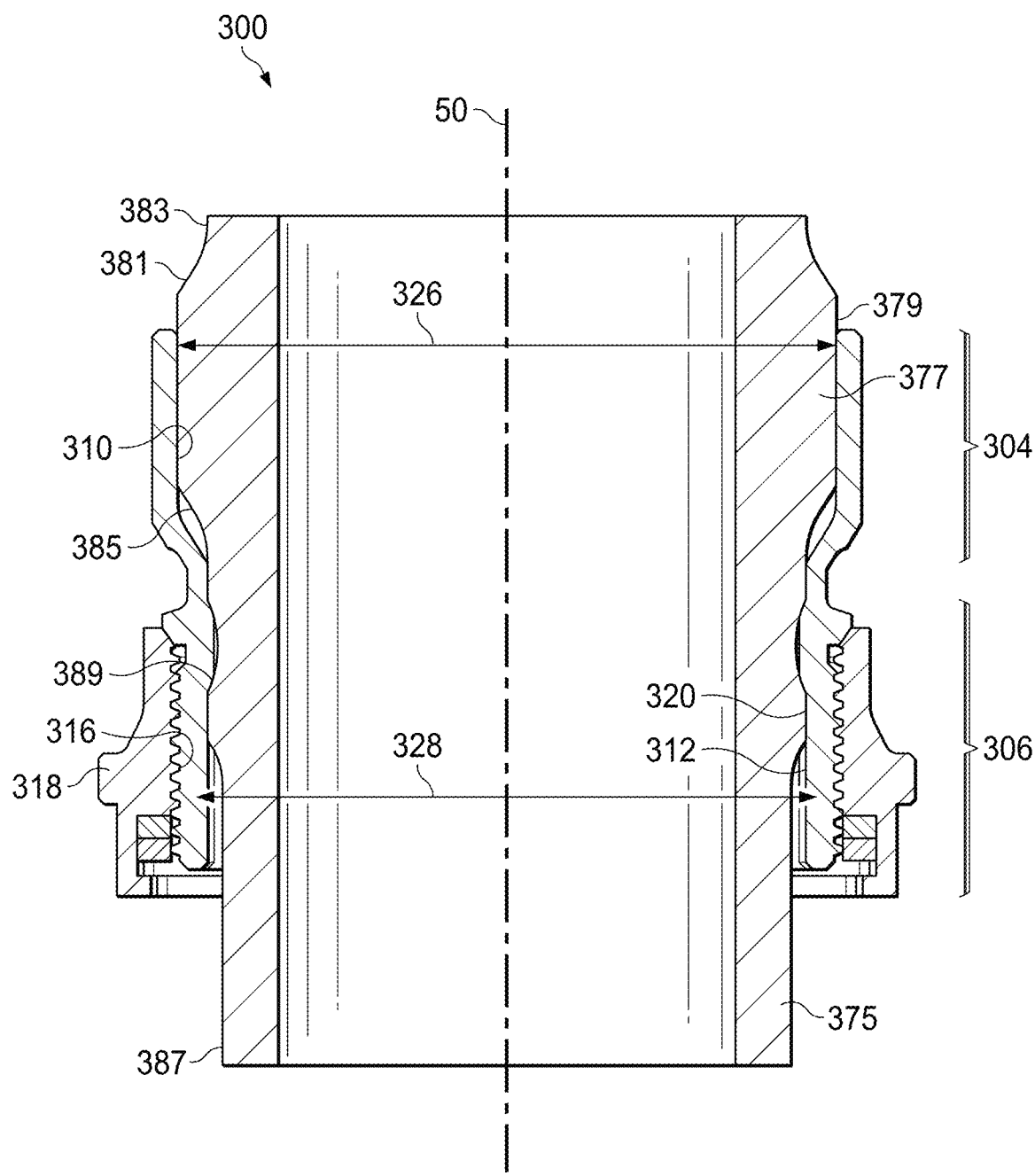
FIG. 4 is a sectional view of an exemplary self-securing bearing raceway clamped on a shaft.
Figure 5:
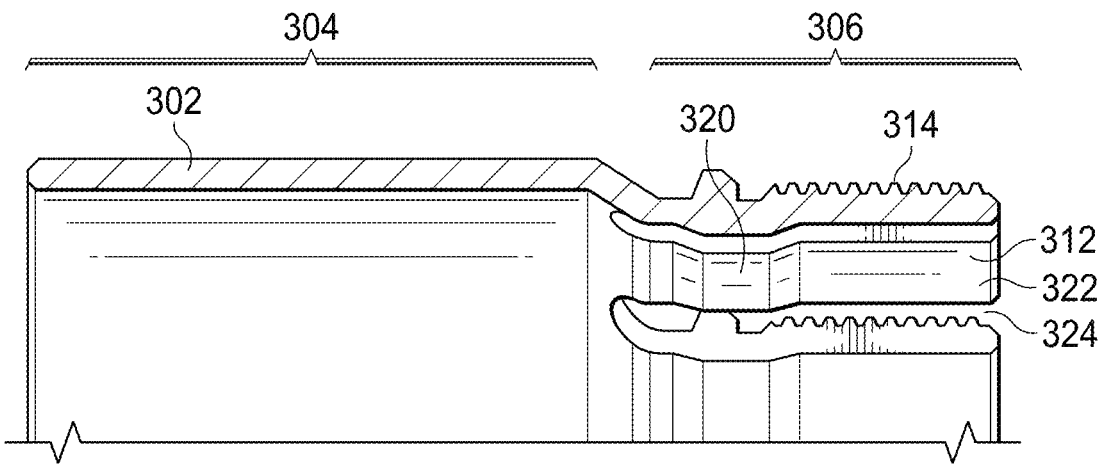
FIG. 5 is partial section view of an exemplary tubular bearing raceway.
Figure 6:
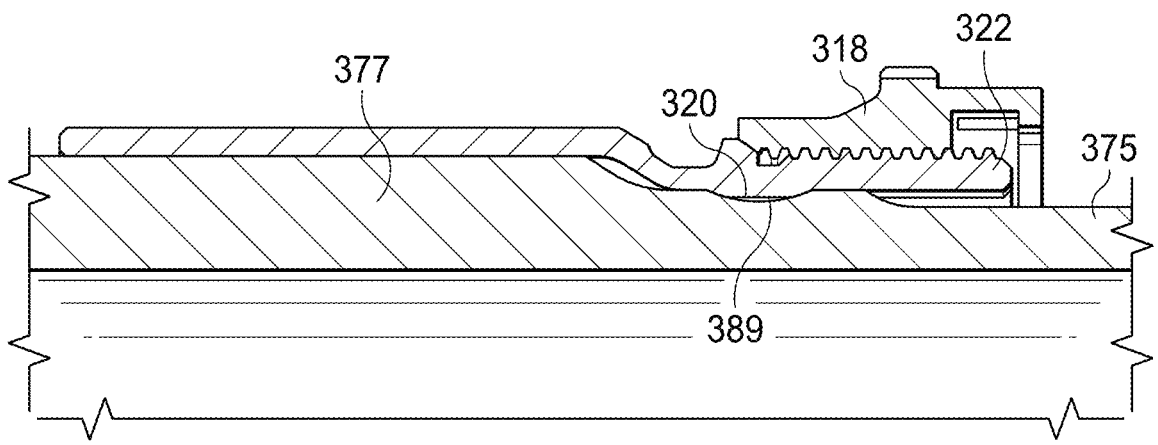
FIG. 6 is a partial section view of an exemplary self-securing bearing raceway clamped to a shaft according to one or more aspects of the disclosure.
Figure 7:
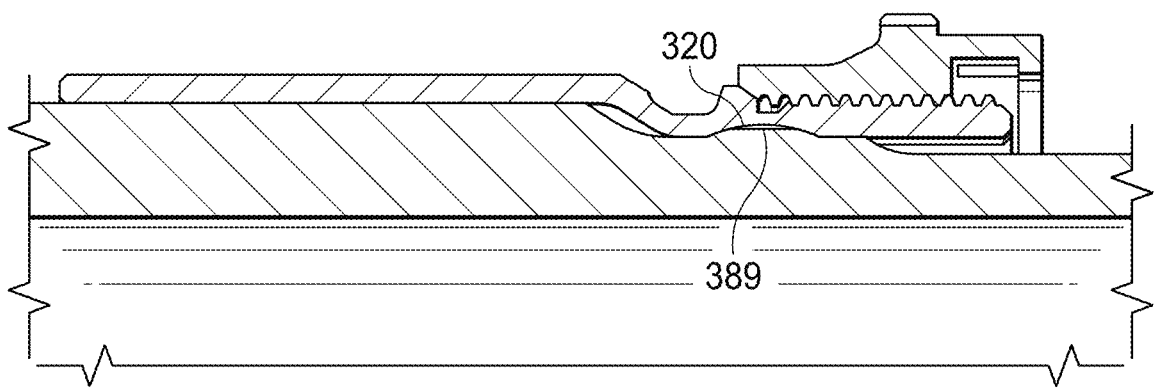
FIG. 7 is a partial section view of an exemplary self-securing bearing raceway clamped to a shaft according to one or more aspects of the disclosure.
Figure 8:
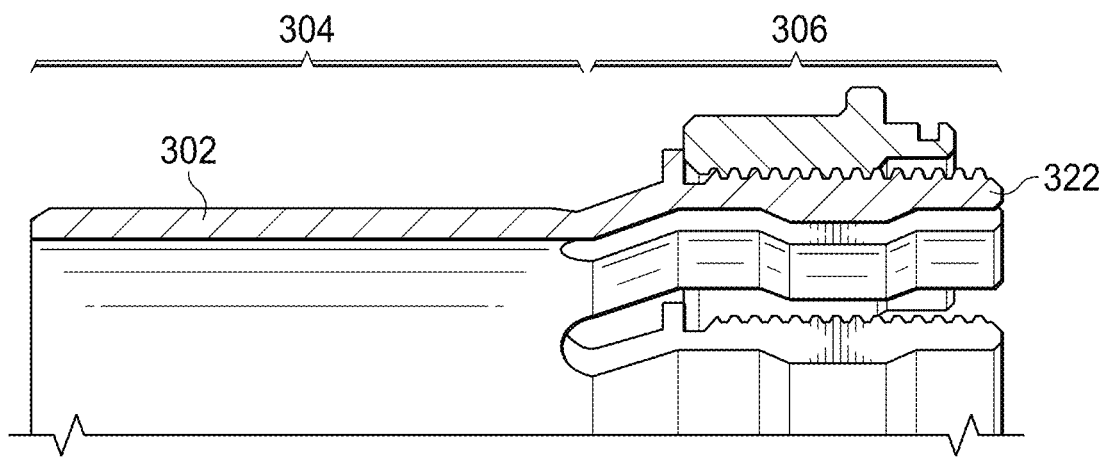
FIG. 8 is partial section view of another exemplary self-securing bearing raceway.

With reference to FIG. 4, raceway section 304 has a diameter 326 and clamp section 306 has a diameter 328 that is different from diameter 326. In FIG. 4, diameter 326 is greater than diameter 328. However, the diameter of raceway section 304 may be less than the diameter of clamp section 306 illustrated for example in FIGS. 5 and 11.

Figure 9:
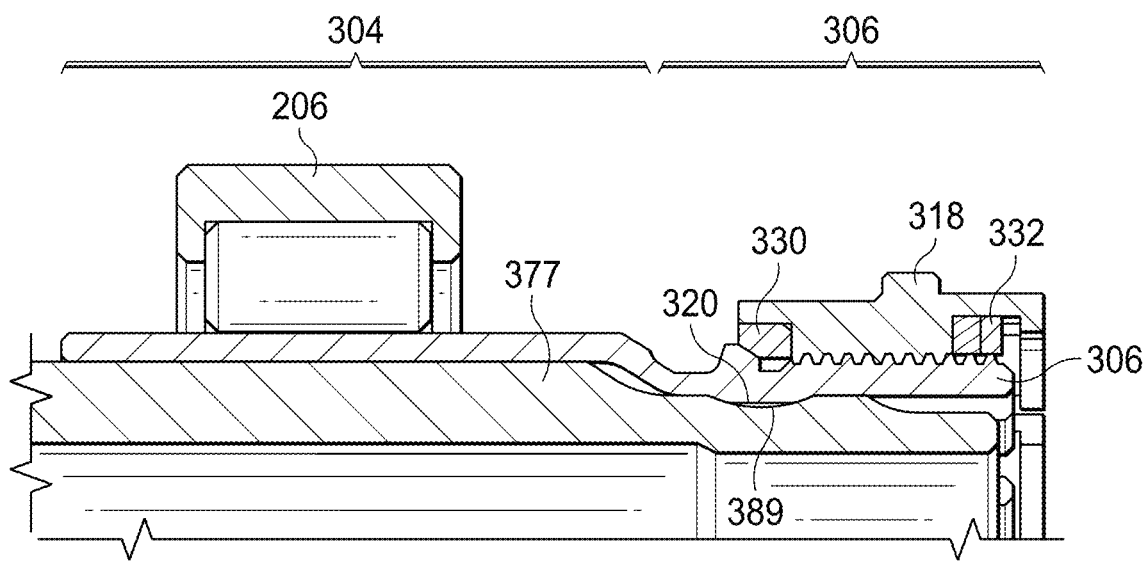
FIG. 9 is a partial section view of an exemplary self-securing bearing raceway clamped to a shaft according to one or more aspects of the disclosure.

FIG. 9 illustrates an exemplary connection of bearing raceway 300 to a mast 375. Bearing raceway 300 is slid onto mast 375 with raceway section 304 positioned circumferential around raised portion 377. The diameter of raceway section 304 may be less than the diameter of raised portion 377 providing a pressed-on raceway. First engagement profile 320 on clamp section 306 and second engagement profile 389 are mated resisting axial movement of bearing raceway 300. Nut 318 is threaded to the external threads of clamp section 306 applying a clamping force onto the mast. In this example, nut 318 is threaded with clamp section 306 with a pressure ring 330 in addition to a lock ring and washer 332. The pressure ring can be used when a greater, atypical, amount of preload is desired.

Figure 10:
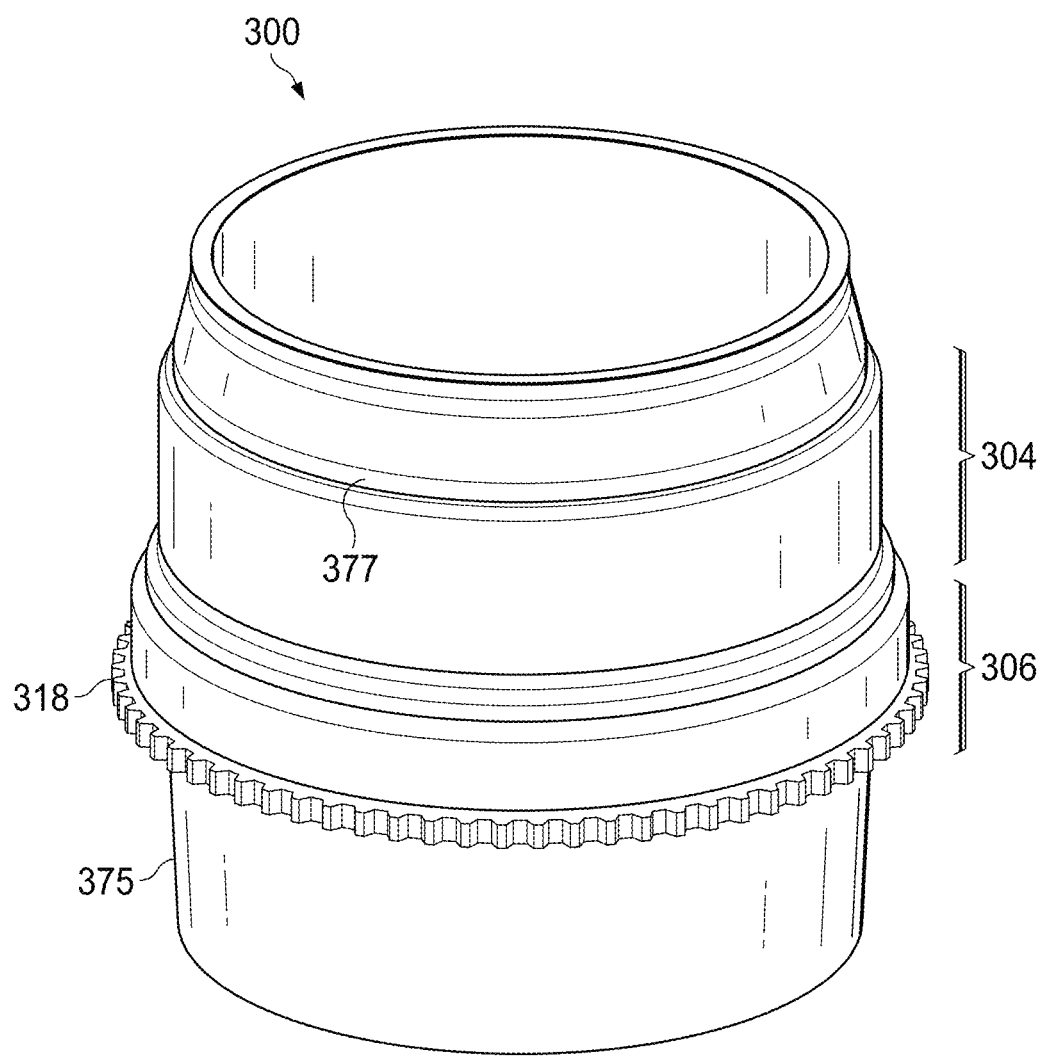
FIG. 10 illustrates another exemplary self-securing bearing raceway clamped to a shaft.
Figure 11:
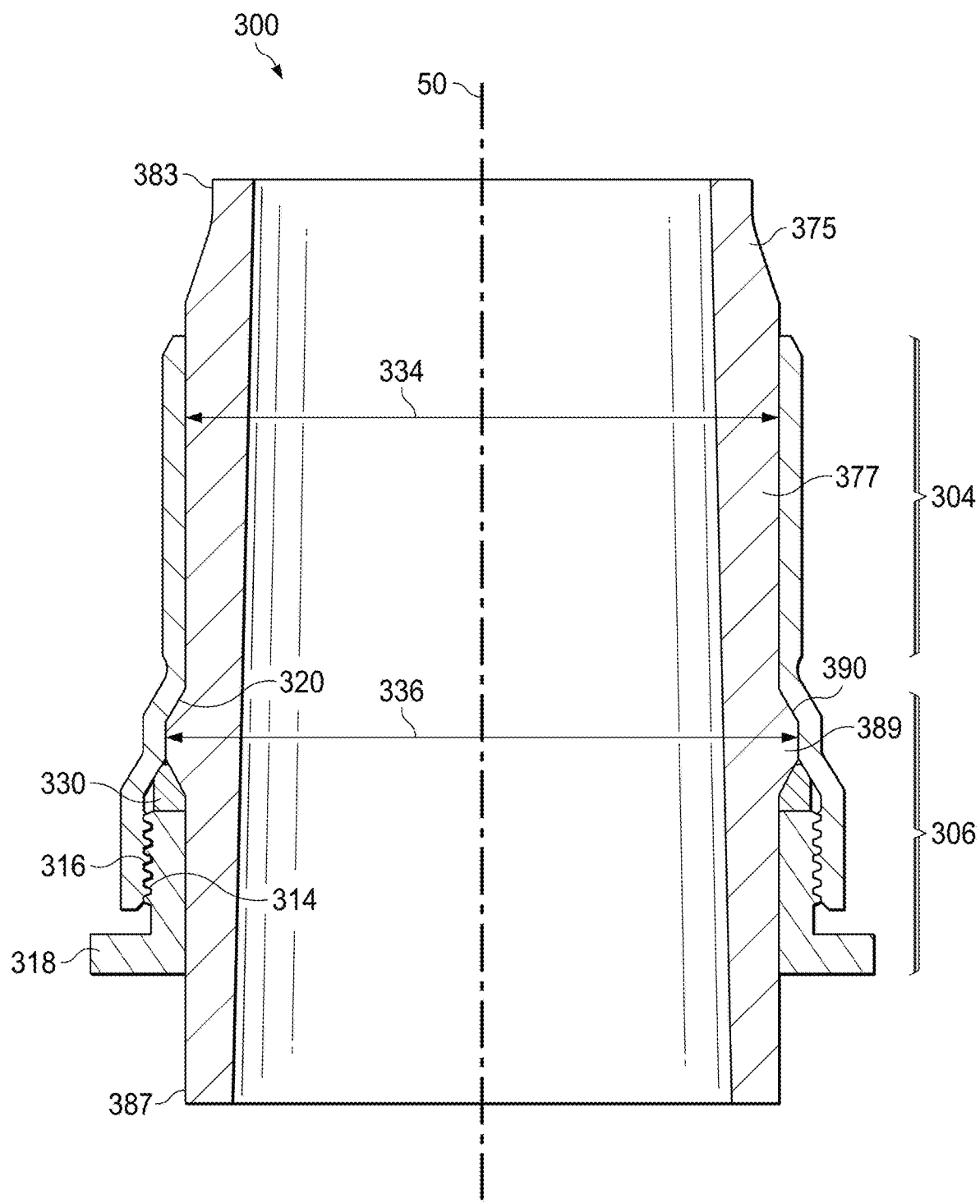
FIG. 11 is a sectional view of the exemplary self-securing bearing raceway of FIG. 10.

Turning now to FIGS. 10 and 11 exemplary aspects of an exemplary bearing raceway 300 having internal first threads 314 are described. Engagement profile 389 on mast 375 is positioned axially from raised portion 377 and is a raised feature relative to raised portion 377. For example, raised portion 377 has a diameter 334 that is less than the diameter 336 of raised feature 389 providing a face 390, for example an angled face, that is oriented toward, or facing, raised portion 377. Engagement profile 320 on the inner surface of clamping section 306 is a face, for example angled face, oriented away from raised portion 377. The tubular sleeve of bearing raceway 300 is slid, clamp section 306 first, onto mast 375 from a first end 383 until engagement profile 320 contacts engagement profile 389, e.g., mating faces, stopping axial movement. Raceway section 304 is positioned circumferentially on raised portion 304 when engagement profiles 320, 389 mate. Nut 318 having external threads 316 is then threaded to internal threads 314 of clamp section 306 applying a clamping force between the clamp section and the mast. A pressure ring 330 may be located between the nut 318 and raised feature 389.

Nut 318 may be a split nut and pressure ring 330 may be a split ring to facilitate sliding the nut and the pressure ring over the tubular sleeve of bearing raceway 300, the raised portion 377, and the raised feature 389 in the direction from first end 383 toward second end 387. Second end 387 may have a diameter that prevents sliding the bearing raceway components onto the mast, see for example the bottom end of the mast illustrated in FIG. 2.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent as understood by a person of ordinary skill in the art.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A bearing raceway for a shaft, the bearing raceway comprising:
   a tubular sleeve comprising a raceway section and a clamp section;
   the raceway section having a hardened outer surface and a first, axially linear, inner surface, wherein the first, axially linear, inner surface runs an entire length of the raceway section; and
   the clamp section having first threads and a second, axially non-linear, inner surface, wherein the second inner surface comprises a first engagement profile, wherein the first engagement profile comprises at least one of a semi-circular groove, a recess and a dimple and is configured to mate with a second engagement profile on the shaft to resist axial movement of the bearing raceway;
   wherein the first threads are internal threads and are configured to mate with second threads on a nut to clamp the tubular sleeve to the shaft.

2. The bearing raceway of claim 1, wherein the clamp section comprises a detent on the second inner surface.

3. The bearing raceway of claim 1, wherein the clamp section comprises tabs separated by slots.

4. The bearing raceway of claim 3, wherein the tabs comprise detents on the second inner surface.

5. The bearing raceway of claim 1, wherein the first engagement profile is positioned between the raceway section and the first threads.

6. The bearing raceway of claim 5, wherein the first engagement profile comprises a face oriented away from the raceway section toward the first threads.

7. The bearing raceway of claim 5, wherein a diameter of the clamp section is greater than a diameter of the raceway section.

8. A rotor aircraft mast bearing assembly, comprising:
   a bearing raceway secured to a mast of a rotor aircraft, the mast comprising a central axis and a raised portion having a first mast surface that is parallel to the central axis, the bearing raceway comprising a tubular sleeve having a raceway section and a clamp section;

the raceway section having a hardened outer surface and a first, axially linear, inner surface positioned on the first mast surface, wherein the first, axially linear, inner surface runs an entire length of the raceway section;

the clamp section having first threads and a second, axially non-linear, inner surface, wherein the second inner surface comprises a first engagement profile, wherein the first engagement profile comprises at least one of a semi-circular groove, a recess and a dimple and is configured to mate with the raised portion to resist axial movement of the shaft bearing raceway; and a nut having second threads threaded with the first threads imparting a clamping force to the mast;

wherein the first threads are internal threads.

9. The rotor aircraft mast bearing assembly of claim 8, wherein the clamp
section comprises a first detent mated with a second detent on the mast.

10. The rotor aircraft mast bearing assembly of claim 8, wherein the clamp section comprises tabs separated by slots; and
the first thread are on the tabs.

11. The rotor aircraft mast bearing assembly of claim 10, wherein the tabs comprise first detents mated with a second detent on the mast.

12. The rotor aircraft mast bearing assembly of claim 8, wherein the first engagement profile is a face oriented away from the raceway section and toward the first threads.

* * * * *